Nov. 26, 1929.   M. L. ALMQUIST   1,736,816
ALTERNATING CURRENT RELAY
Filed March 23, 1927
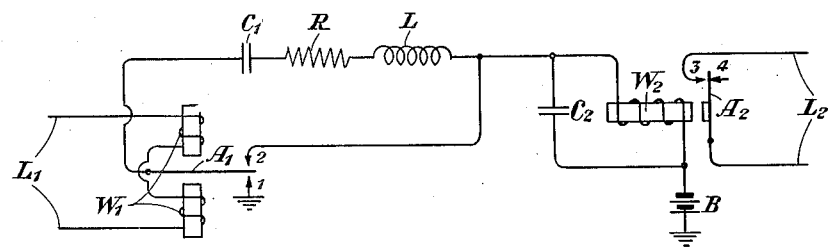
INVENTOR.
M. L. Almquist
BY
ATTORNEYS.

Patented Nov. 26, 1929

1,736,816

UNITED STATES PATENT OFFICE

MILTON L. ALMQUIST, OF BROOKLYN, NEW YORK, ASSIGNOR TO AMERICAN TELEPHONE AND TELEGRAPH COMPANY, A CORPORATION OF NEW YORK

ALTERNATING-CURRENT RELAY

Application filed March 23, 1927. Serial No. 177,747.

This invention relates to electromagnetic relays employed in signaling systems, and particularly to arrangements for operating a direct current relay from the contacts of an alternating current relay.

In this application an arrangement will be described interconnecting a polar or alternating current relay which is connected to a source of alternating current, and a direct current relay so that the direct current relay will operate and remain continuously operated when the current impressed upon the winding of the polar or alternating current relay has a definite and predetermined frequency, or when the frequency of the latter current lies anywhere between definite limits. A selective arrangement may be interposed between the polar or alternating current relay and the direct current relay, which will tend to prevent the false operation of the direct current relay due to the presence of extraneous or interfering currents impressed upon the winding of the polar or alternating current relay.

While this invention will be pointed out with particularity in the appended claims, the invention itself, both as to its further objects and features, will be better understood from the detailed description hereinafter following, when read in connection with the accompanying drawing, showing one embodiment of the invention merely for the purpose of illustration.

Referring to the drawing, the winding of a polar or alternating current relay is designated by the reference character $W_1$, winding $W_1$ being connected through leads $L_1$ to a source of current of signaling frequency. The polar or alternating current relay has an armature $A_1$ which is free to vibrate between contacts 1 and 2 on either side thereof. Armature $A_1$ may, if desired, rest initially against either of these contacts. When alternating current from the source is applied to the winding $W_1$ of the polar or alternating current relay through the leads $L_1$, the armature $A_1$ will vibrate between the contacts 1 and 2 at the frequency of the current applied.

The winding of the direct current relay is designated by the reference character $W_2$, this direct current relay having an armature $A_2$ and contacts 3 and 4 on either side thereof. When the armature $A_2$ closes contact 3, an output circuit connected to the leads $L_2$ will be closed, and when the armature $A_2$ moves away from contact 3, the output circuit connected to the leads $L_2$ will be opened.

Two condensers, $C_1$ and $C_2$ are provided in this system, condenser $C_1$ being connected directly in series with a resistance R and an inductance L, a battery B being also provided for charging these condensers. The condenser $C_2$ is connected directly across the winding $W_2$ of the direct current relay and is of a sufficiently large capacity so that upon discharge through said winding it may maintain the direct current relay operated for a definite and predetermined interval of time, as will be described more fully hereinafter. The inductance L is located in the circuit in series with the condenser $C_1$ to provide a series resonant circuit exhibiting very low reactance at any frequency within predetermined limits, the net magnitudes of the inductive and capacitative reactances in the circuit including the inductance L and condenser $C_1$ being modified somewhat by the inductance of the winding $W_2$ and the capacity of the condenser $C_2$, respectively. Resistance R is connected in series with inductance L and condenser $C_1$ in order to control the degree of selectivity to be provided by the circuit. In other words, the magnitude of resistance R may be employed to control the width of the band of frequencies at which the direct current relay will operate and remain operated.

When the armature $A_1$ of the polar or alternating current relay vibrates with sufficient amplitude, it will alternately make contacts 1 and 2. When contact 1 is made by armature $A_1$, condensers $C_1$ and $C_2$ will be charged from the battery B, the charging circuit including the battery B, the winding of the direct current relay $W_2$ and the condenser $C_2$ in shunt therewith, the inductance L, the resistance R, the condenser $C_1$, the armature $A_1$ of the polar or alternating current relay, contact 1 and ground. Under normal operating conditions, the charging current is of itself sufficient to operate the direct current relay and to maintain it operated only for a brief period of time. As the direct current relay is operated, the armature $A_2$ is attracted, closing the output circuit connected to the leads $L_2$. Condenser $C_2$ being in shunt with the winding $W_2$ of the direct current relay discharges through the winding $W_2$ of this relay, causing the relay to remain operated, condenser $C_2$ being also of sufficiently high capacity so that the direct current relay will remain operated for the time required for the armature $A_1$ of the polar or alternating current relay to move from contact 1 to contact 2 and back to contact 1, particularly when current of the proper frequency is impressed upon the winding $W_1$ of the polar or alternating current relay.

When the armature $A_1$ of the polar or alternating current relay closes contact 2, condenser $C_1$ will be discharged through the resistance R and the inductance L, the discharge circuit including the condenser $C_1$, the resistance R, the inductance L, contact 2 and armature $A_1$ of the polar or alternating current relay. It will be apparent that the discharge of the condenser $C_2$ through the winding $W_2$ of the direct current relay ordinarily takes place after armature $A_1$ of the polar or alternating current relay has moved away from contact 1. Thereafter the armature $A_1$ again closes contact 1, charging condensers $C_1$ and $C_2$, and so it continues. It will be observed that the winding $W_2$ of the direct current relay is energized partly by the flow of current from battery B upon charge, and partly by the flow of current upon discharge of condenser $C_2$. It will also be apparent that the direct current relay will remain energized as long as the armature $A_1$ of the polar or alternating current relay continues to move between contacts 1 and 2 in response to the flow of current through winding $W_1$ of proper frequency.

One of the features of this invention is that the time constant in the charging circuit is substantially equal to the time constant in the discharging circuit. In other words, the time required to charge condensers $C_1$ and $C_2$ to their proper values by their connection to battery B is substantially the same as the time required for the condenser $C_1$ to discharge through the circuit including the resistance R, the inductance L and the armature $A_1$. In the particular circuit described the time constants in the charging and discharging circuits may be made substantially equal by making the capacity of the condenser $C_2$ large as compared to the capacity of the condenser $C_1$.

Another feature of this invention is that the circuit arrangement interconnecting the polar or alternating current relay and the direct current relay is of the selective type. The charging circuit is in effect a series resonant circuit in which resistance is interposed to control the sharpness of the resonant property of the circuit. In a simple series circuit containing nothing more than inductance and capacity there is a definite value of frequency for which the total reactance in the circuit is zero, and at this frequency the impedance of the circuit is exactly the same as the resistance of the circuit. This frequency is generally known as the frequency of resonance, and the series circuit is then said to be in a condition of resonance at this frequency. The impedance of the series circuit at the frequency of resonance has its smallest value, the value being equal to the resistance in the circuit, and the current which flows in the circuit at the frequency of resonance has its greatest value. In the circuit arrangement described herein for illustrative purposes, the condenser $C_1$, the resistance R, the inductance L and the winding $W_2$ and condenser $C_2$ in parallel therewith provide a modified form of the series resonant circuit above mentioned. This circuit exhibits negligible reactance at frequencies between definite and predetermined limits. These limiting frequencies may be chosen so that the direct current relay will be operated and remain operated only when the frequencies of the currents impressed upon the winding $W_1$ of the polar or alternating current relay lie therebetween. In other words, the direct current relay will not be operated if the frequency of the current impressed upon the winding $W_1$ of the polar or alternating current relay is outside of the above mentioned limits. Thus the provision of a circuit including inductance and capacity interconnecting a polar or alternating current relay and a direct current relay will introduce selectivity and will prevent the system from responding until the proper frequency characteristics have been established.

If the frequency of the current impressed upon the winding $W_1$ of the polar relay is above the upper of the predetermined limits, condenser $C_1$ will not be given sufficient time to properly charge and discharge, its rate of charge and discharge being controlled primarily by the inductance L. The direct current relay will then not receive sufficient current and may not operate and stay operated. On the other hand, if the frequency of the current impressed upon the winding $W_1$ is below the lower of the predetermined limits, condenser $C_2$ will, upon discharge, be unable to maintain sufficient current through the winding $W_2$ of the direct current relay, and hence the latter relay will not be maintained in an operative condition. However, when the frequency of the current impressed upon the winding $W_1$ of the polar relay is of a suitable value, i. e., if this frequency lies between the above-mentioned predetermined limits, condenser $C_1$ will become charged and discharged at the proper rate, and then the voltage built up across this condenser may become higher than the normal operating voltage of battery B due to the well known resonance effects. Clearly, this latter condition will result in considerable frequency discrimination.

While this invention has been shown and described in one particular embodiment merely for the purpose of illustration, it will be distinctly understood that the general principles of this invention may be applied to other and widely varied organizations without departing from the spirit of the invention or the scope of the appended claims.

What is claimed is:

1. The combination of a polar relay the winding of which is connected to an alternating current source and the armature of which may vibrate between two contacts, a direct current relay, and a selective circuit having a predetermined natural period interconnecting the armature of the polar relay and the winding of the direct current relay, said selective circuit including inductive and capacitative reactance elements of predetermined magnitudes, said selective circuit permitting the direct current relay to be operated and to remain operated when current of said predetermined period is applied to the winding of said polar relay by said alternating current source and preventing the operation of said direct current relay when such current is not impressed upon the winding of said polar relay.

2. The combination of a polar relay the winding of which is connected to an alternating current source, a direct current relay, and means including a tuned circuit interconnecting the polar relay and the direct current relay for operating the direct current relay and for maintaining it operated when current of the source impressed upon the winding of the polar relay has a frequency corresponding to the natural period of said tuned circuit.

3. The combination of a circuit carrying an alternating current, an alternating current relay the winding of which is connected to said circuit, an armature for said alternating current relay arranged to be vibrated when said relay is energized by the alternating current flowing in said circuit, contact members on either side of said armature, a direct current relay, a first condenser, a second condenser, an inductance, and a source of direct current, the armature of said alternating current relay, the first condenser, the inductance, the second condenser and the source of direct current being serially connected when the armature of the alternating current relay closes one of said contact members the second condenser being connected across the winding of the direct current relay, the first condenser and the inductance being connected serially when the armature of the alternating current relay closes the other of said contact members.

4. The combination of a polar relay the winding of which is connected to an alternating current source, the armature of said polar relay being free to move between two contact members, a direct current relay, first and second condensers, an inductance, and a source of direct current, said condensers, the inductance and the source of direct current being serially connected when the armature of the polar relay closes one of said contact members, the first condenser and the inductance being serially connected when the armature of the polar relay closes the other of the contact members, the second condenser being connected across the winding of the direct current relay.

5. The combination of an alternating current relay, the armature of the alternating current relay being free to vibrate between two contact members, a direct current relay, a tuned circuit comprising inductance and capacity, and a source of direct current, said tuned circuit being connected through the winding of direct current relay to the source of direct current when the armature of the alternating current relay closes one of its contact members whereby the capacity of the tuned circuit becomes charged, the tuned circuit being shunted when the armature of the alternating current relay closes the other of its contact members whereby the capacity of the tuned circuit becomes discharged.

6. The combination of an armature which is free to move between two contact members, first and second condensers, a resistance, an inductance, a direct current relay, and a source of direct current, the condensers, the resistance, the inductance and the source of direct current being serially connected when the armature closes one of said contact members whereby said condensers may become charged, the charging current operating the direct current relay, the first condenser being discharged through the resistance and the inductance when the armature closes the other of said contact members, the second condenser maintaining the direct current relay operated during the time required for said armature to move back and forth between said contact members.

In testimony whereof, I have signed my name to this specification this 19th day of March, 1927.

MILTON L. ALMQUIST.